Aug. 16, 1949.    S. L. GOLDSBOROUGH    2,479,345
SINGLE-ELEMENT DISTANCE GROUND-RELAY
Filed April 29, 1948
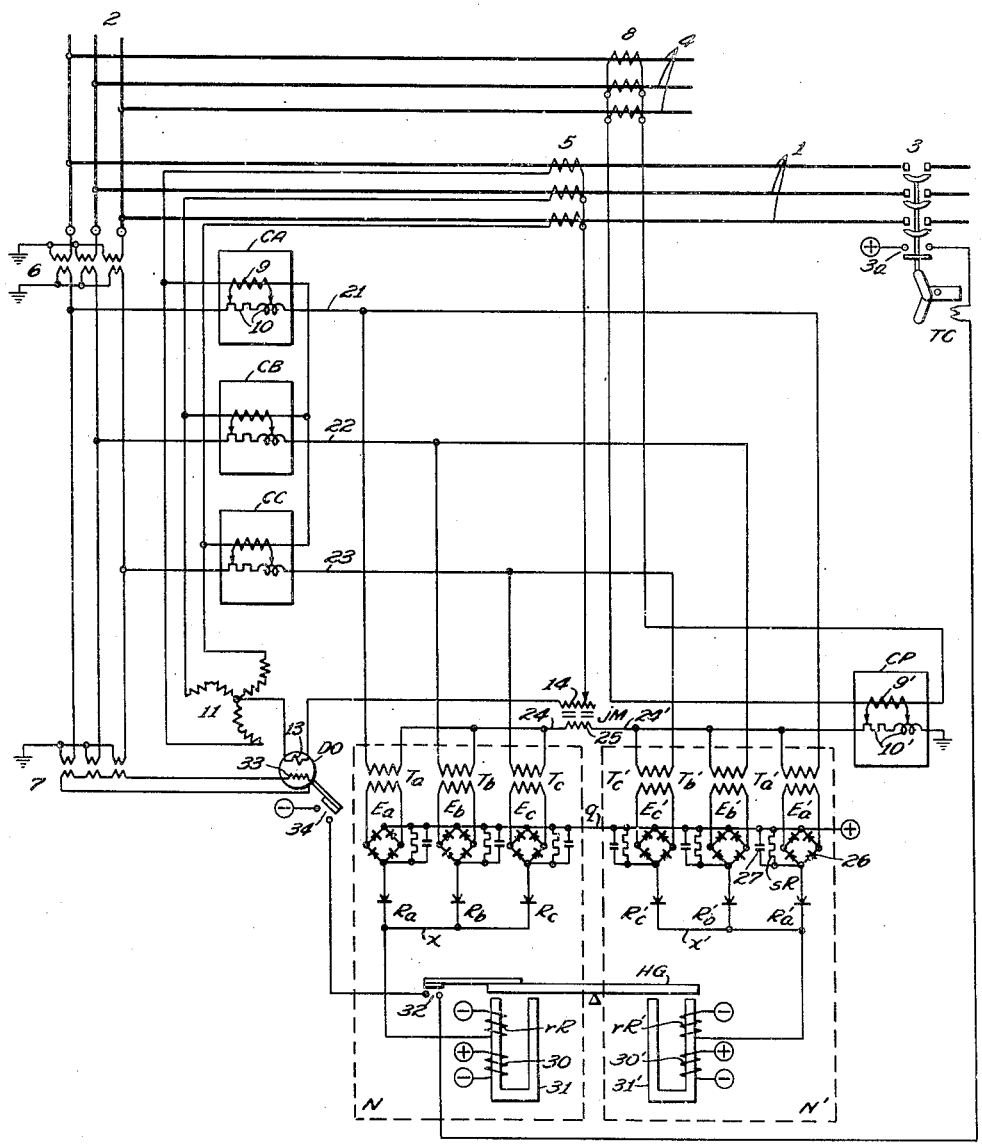
WITNESSES:
Robert A Baird
Rev. C. Groove
INVENTOR
Shirley L. Goldsborough.
BY O.B. Buchanan
ATTORNEY Patented Aug. 16, 1949

2,479,345

UNITED STATES PATENT OFFICE 2,479,345

SINGLE-ELEMENT DISTANCE GROUND RELAY

Shirley L. Goldsborough, Basking Ridge, N. J., assignor to Westinghouse Electric Corporation, East Pittsburgh, Pa., a corporation of Pennsylvania Application April 29, 1948, Serial No. 24,040

3 Claims. (Cl. 175—294)

My invention relates to a ground reactance relay which is associated with networks for making the proper phase-selection in the event of a single ground fault on a three-phase line which is being protected.

It has been known, since the publication of the Lewis Patent 1,897,022 in 1933, that a reactance relay can be used for fairly accurately measuring the distance of ground-faults, irrespective of the ground fault resistance, if the relay-current or the relay-voltage is properly compensated for the effects of various phase-sequence components of the currents in the faulted line and in any parallel line or lines.

A suitable form of high-speed beam-type reactance-relay is shown in Fig. 3 of the Lewis Patent 1,967,093 of 1934, and an improved form of this relay is shown in the Mehring Patent 2,439,944, granted April 20, 1948, on an application Serial No. 576,973. In this improved reactance-relay, a beam-type relay or other differential relay is provided with a restraining force responsive to the line-voltage, and an operating force responsive to the vectorial sum of the same voltage plus the line-current lagged 90°, this current-responsive current-component being introduced by means of an air-gap current-transformer which is used as a mixing-transformer or compensator-reactor.

In 1946, my Patent 2,408,208 was granted, showing the use of phase-selector-operated switching-means for switching the proper voltage onto a single ground reactance relay, so that a single relay would respond to ground-faults on any one of the three phases of the protected line.

An object of my present invention is to provide minimum-voltage networks, in place of the selector-operated switching-means, for energizing both the operating side and the restraining side of a reactance-relay of the type shown in the Mehring patent, otherwise using the connections shown in my 1946 patent. On the restraint-side, I use the smallest of the suitably compensated line-to-neutral voltages, and this smallest voltage is obviously the voltage of the faulted phase, in the event of a single ground fault. On the operating side, I use the same compensated voltage, to which is added a lagged zero-sequence current-component, but this current-component does not need to be very large, and analysis has shown that the smallest modified voltage is still the voltage of the faulted phase. For the minimum-voltage networks, I prefer a type shown in my copending application, Serial No. 788,583, filed November 28, 1947, using rectifiers, so that my single-element ground reactance relay has direct-current energization.

With the foregoing and other objects in view, my invention consists of the circuits, systems, combinations, apparatus, parts and methods of design and operation described and claimed in the following specification, and illustrated in the accompanying drawing, the single figure of which is a simplified diagrammatic view of circuits and apparatus embodying my invention in an illustrative form of embodiment.

I have illustrated my invention as being applied to the protection of a line-section 1, which may be a part of a three-phase, 60-cycle transmission or distribution system. The three-phase line 1 is connected to a three-phase bus 2 through line-segregating circuit-interrupting means such as a three-phase circuit-breaker 3, which is illustrated as having an auxiliary make-contact 3a and a trip-coil TC. In the general case, there are also one or more parallel lines 4, paralleling the protected line-section 1, as shown in the drawing.

The three-phase relaying currents and voltages are derived from the protected line-section 1 by means of line-current transformers 5 and potential-transformers 6, respectively, for responding to the line-current and to the line-voltage. A bank of auxiliary potential-transformers 7 may also be energized from the potential-transformers 6 for providing a response to the zero-sequence voltage-component. The parallel line 4 is also provided with line-current transformers 8.

When the relaying equipment is used on a power-system which is grounded at more than one point, or which otherwise involves errors in ground-fault distance-measurement due to the manner in which the positive, negative, and zero-sequence currents distribute themselves, it is necessary to use some sort of compensating means as set forth in the Lewis Patent 1,897,022. In order to provide a ground-distance relay which is of general application to many different transmission-systems, I therefore use such compensation. As in the case of my Patent 2,408,208, I prefer the voltage-compensated method which is shown in Fig. 9 of said Lewis patent. I also prefer the reactance-relay of the Mehring patent, and the use of zero-sequence line-currents to measure the zero-sequence reactance to the point of location of the fault.

As shown in the drawing, the illustrated compensating method uses three compensators CA, CB and CC, one for each phase, and when there is a parallel line such as the line 4, another compensator CP, one for each of the parallel lines. The three phase-responsive compensators CA, CB and CC have auxiliary current-transformers 9 which are energized from the respective phase-currents of the line, from which the zero-sequence component has been removed, and these auxiliary current-transformers 9 are used to energize suitable impedances 10, which are adjustable in phase and magnitude. In the case of the parallel-line compensator CP, the auxiliary current-transformer 9' is energized from the residual current of the line-current transformers 8 of the parallel line-section 4, and this auxiliary current-transformer 9' energizes an adjustable impedance 10'.

The zero-sequence current-component is withdrawn from the relaying currents of the protected line-section I by means of a suitable grounding-transformer such as an interconnected-star bank 11. The neutral point of the interconnected-star bank 11 is connected to the neutral point of the line-current transformer 5 through the current-coil 13 of a ground-directional element DO, and the adjustably tapped primary winding 14 of an air-gap current-transformer or mutual reactor $jM$.

The adjustable impedances 10 of the three phase-responsive compensators CA, CB and CC are respectively connected in the three phase-to-ground voltage-circuits 21, 22 and 23 which are energized from the respective phases A, B and C of the potential-transformers 6.

In accordance with my present invention, the voltage-circuits 21, 22 and 23 are used to energize two minimum-voltage networks N and N'. Each minimum-voltage network N and N' derives three modified line-voltages $E_a$, $E_b$, $E_c$, and $E_a'$, $E_b'$, $E_c'$, respectively, which are obtained in the secondary windings of potential-transformers $T_a$, $T_b$, $T_c$ and $T_a'$, $T_b'$, $T_c'$, respectively. The primary windings of the transformers $T_a$, $T_b$ and $T_c$ have one terminal connected to the respective voltage-circuits 21, 22 and 23, while their other terminals are connected to a common neutral connection 24. The neutral connection 24 is connected, through the secondary winding 25 of the mutual reactor $jM$, to another common neutral connection 24' which is connected to one terminal of the primary windings of the transformers $T_a'$, $T_b'$ and $T_c'$ of the other network N'. The other terminals of the primary windings of these transformers $T_a'$, $T_b'$ and $T_c'$ are connected to the respective voltage-circuits 21, 22 and 23. The second common neutral circuit 24' is connected to the adjustable impedance 10' of the parallel-line compensator CP, and thence to ground and back to the secondary windings of the line-voltage potential-transformers 6.

The six modified line-voltages $E_a$, $E_b$, $E_c$, $E_a'$, $E_b'$ and $E_c'$ of the two minimum-voltage networks N and N' are each rectified by a separate rectifier-bridge 26, each bridge having its direct-current output-terminals shunted by its own resistor $sR$ and (preferably also) by its own ripple-smoothing capacitor 27. The positive output-terminals of the six bridges 26 are connected to a common positive bus $q$. The three negative output-terminals of the bridges 26 of one network N are separately connected, through individual rectifiers $R_a$, $R_b$ and $R_c$, to a common negative bus $x$ for that network. The three negative output-terminals of the bridges 26 of the other network N' are likewise separately connected, through individual rectifiers $R_a'$, $R_b'$ and $R_c'$, to a common negative bus $x'$ for that network. The rectifiers $R_a$, $R_b$, $R_c$, $R_a'$, $R_b'$ and $R_c'$ conduct current in the direction toward the respective negative buses $x$ and $x'$.

The two minimum-voltage networks N and N' use a common direct-current source which is represented by positive and negative terminals $(+)$ and $(-)$. The positive terminal $(+)$ is connected to the common positive bus $q$ of the two networks. The network N has an operating-coil 30 and a restraint-coil $rR$ mounted on a common magnetic circuit 31. In like manner, the other network N' has an operating-coil 30' and a restraint-coil $rR'$ mounted on another common magnetic circuit 31'. The two restraint-coils $rR$ and $rR'$ are energized between the negative terminal $(-)$ and the respective negative buses $x$ and $x'$, each in its own minimum-voltage network. The two operating-coils 30 and 30' are both energized from the positive and negative buses $(+)$ and $(-)$.

In accordance with my invention, the two magnetic circuits 31 of the two minimum-voltage networks are used as the electromagnet frames on the operating and restraining sides, respectively, of an instantaneous differential relay HG of a balanced-beam type, having contacts 32 which are closed when the force exerted by the operating electromagnet 31 exceeds that exerted by the restraining electromagnet 31'.

While, in general, my present invention would be used as a part of a much larger, more complex relaying system, with provisions for phase-fault protection, double or triple grounds, and the like, I have shown it only as a means for protecting the protected line-section I against single line-to-ground faults, and comprising, in addition to the ground-distance element HG, a ground-directional element DO. This ground-directional element DO is shown as a product-type relay having a current-coil 13 as previously described, and also having a voltage-coil 33 which is energized, responsively to the residual line-voltage, from the auxiliary potential-transformers 7. The ground-directional relay DO has a contact 34 which is used in a tripping circuit which extends from the negative terminal $(-)$ through the two relay-contacts 34 and 32, the trip-coil TC, and the auxiliary breaker-switch $3a$, and thence to the positive terminal $(+)$.

The operation of my invention is based upon the equation for the line-to-ground voltage $E_{aG}$ of the faulted phase at the relaying station, calling the faulted phase phase-A, and assuming a line-to-ground fault at a distance which is $m$ times the length of the protected line-section.

I shall use the following notation:

$E_{aG}$ = line-to-ground voltage of the faulted phase at the relaying station in the event of a single ground-fault, $Z_1$ = positive-sequence impedance of one conductor of the protected line-section, $Z_0$ = zero-sequence impedance of same, $I_a$ = line-current in the faulted phase, $I_0 = \frac{1}{3}I_a$ = zero-sequence current in the protected line-section, $M_0$ = zero-sequence mutual impedance between the protected line-section and each of the other parallel lines, $I_0'$ = zero-sequence current in the parallel line or lines, $R_F$ = fault-resistance, $I_F$ = total fault-current from both ends of the protected line-section, $m$ = fractional part of the length of the protected line-section from the relaying station to the fault, $n$ = fractional part of the length of the protected line-section from the relaying station to the balance point of the relay, $E_r$ = voltage on the restraint-side of the relay, $\theta_0$ = power-factor angle of the zero-sequence current $I_0$ with respect to the zero-sequence line-voltage $E_0$, and $X_0 = Z_0 \sin \theta_0$ = zero-sequence reactance of one conductor of the protected line-section.

The phase-A line-voltage at the relaying station, assuming a phase-A ground-fault, is $$E_{aG} = mZ_1(I_a - I_0) + mZ_0 I_0 + mM_0 O_0' + R_F I_F \quad (1)$$

For the voltage applied to the restraint-side of my ground-reactance relay HG, I use the same modified line-voltage as in Fig. 9 of the Lewis Patent 1,897,022, namely, $$E_r = E_{aG} - nZ_1(I_a - I_0) - nM_0 I_0' \quad (2)$$

This modified line-voltage is obtained by making the compensator-impedances 10 each equal to $nZ_1$, and by making the compensator-impedance 10' equal to $nM_0$. This modified line-voltage $E_r$ is the voltage $E_a'$ of the transformer $T_a'$ of the second minimum-voltage network N'.

Combining Equations 1 and 2, and dividing through by the zero-sequence line-current $I_0$, it will be found that $$\frac{E_r}{I_0} = mZ_0 + (m-n)\left\{Z_1\left(\frac{I_{a-1}}{I_0}\right) + M_0\frac{I_0'}{I_0'}\right\} + R_F\frac{I_F}{I_0} \quad (3)$$

In his Patent 1,897,022, Lewis has pointed out, in his paragraph starting on page 5, line 83, that a reactance-relay responding to the reactive part of Equation 3 will, in general, have a balance-point at $$\frac{E_r}{I_0} = nX_0 \quad (4)$$

The operation of the minimum-voltage networks N and N' is to select the smallest of the three input-voltages. Thus, if $E_a$ is the smallest input-voltage in the first network N, the rectified $E_a$ voltage will be the voltage across the resistor $sR$ which shunts the direct-current terminals of the bridge 26 in this circuit. Neglecting the drop in the rectifier $R_a'$, the voltage of the coil $rR$, which is the voltage between the negative bus $x$ and the negative terminal $(-)$, will be the difference between the voltage E of the direct-current source represented by the terminals $(+)$ and $(-)$, and the rectified $E_a$ voltage. Assuming that the rectifiers $R_b$ and $R_c$ conduct no current in their non-conducting directions, and assuming that the rectified voltages $E_b$ and $E_c$ are both larger than the rectified $E_a$ voltage, the phase-B and phase-C bridges can have no effect on the circuits of the network N. The coil 30 opposes the coil $rR$ and cancels out the E part of the response of the coil $rR$, leaving only the response to the rectified $E_a$ voltage. The other network N' similarly responds to its minimum voltage $E_a'$.

The minimum $E_a'$ voltage of the second network N' is the voltage $E_r$ of Equation 2.

The minimum $E_a$ voltage of the first network N is the vectorial sum of $E_r$ and $-jKMI_0$, where K represents the transformation-ratio as determined by the tap-setting of the mutual reactor $jM$. In general, the modified line-voltage $E_r$ as expressed in Equation 2, can be considered to be in phase with the line-voltage $E_{aG}$, and if this is not so, in any particular transmission-system, it is generally feasible to readjust the line-impedances, particularly the neutral-grounding impedances, so that this will be so.

Hence, the minimum $E_a$ voltage of the first network N is approximately equal to $$E_r - KMI_0 \angle (90° - \theta_0) = \sqrt{E_r^2 + K^2M^2I_0^2 - 2E_r I_0 KM \sin \theta_0}$$

At the balance-point of my ground-distance relay HG, the operating-force is equal to the restraint-force, or $$E_r^2 + K^2M^2I_0^2 - 2E_r I_0 KM \sin \theta_0 = E_r^2 \quad (5)$$

whence $$\frac{E_r}{I_0} \sin \theta_0 = nX_0 = \frac{KM}{2} \quad (6)$$

It will be understood, of course, that the example which I have given is only illustrative. I could have used other phase-sequence compensations, other reactance-relays, or other minimum-voltage networks, although the illustrated example has considerable merit. I wish it to be understood, therefore, that my invention, in its broadest aspects, is subject to considerable modification, in the way of additions, omissions, and the substitution of equivalents, and I desire that the appended claims be given the broadest interpretation consistent with their language.

I claim as my invention:

1. A single-element relay for a polyphase line, said relay having two energizing-means for producing two relay-fluxes, two minimum-voltage networks for energizing the respective energizing-means of the relay, each of said networks having a plurality of input-circuits and a plurality of rectifier-means for energizing a common direct-current flux-producing means in accordance with the smallest of the input-voltages of that network, means for energizing the respective input-circuits of one of said networks in accordance with a plurality of voltages of the polyphase line, and means for energizing the respective input-circuits of the other network in accordance with the vectorial sums of a plurality of voltages of the polyphase line plus a voltage-component having an out-of-phase response to a current derived from said polyphase line, the current-response being sufficiently small so that the vectorial sum for the faulted phase is in general the smallest of the plurality of vectorial sums.

2. The invention as defined in claim 1, characterized by said relay being a differential relay having an operating means and a restraining means, each responsive to the output of one of said networks, the operating means being responsive to the network which is responsive to the minimum vectorial sum of voltage and current, and the restraining means being responsive to the network which is responsive to the minimum voltage.

3. A single-element differential relay having an operating means and a restraining means, two minimum-voltage networks, each having a plurality of input-circuits and a plurality of rectifier-means for energizing a common bus with a direct-current voltage approximating the difference between a given direct-current voltage E and the minimum rectified input-voltage of that network, means for similarly energizing the operating means and the rstraining means of the relay from the respective common buses of the respective networks, means for energizing the respective input-circuits of the network which energizes the restraining means of the relay in accordance with a plurality of voltages of the polyphase line, and means for energizing the respective input-circuits of the other network in accordance with the vectorial sums of the same set of voltages plus a voltage-component having an out-of-phase response to a current derived from said polyphase line, the current-response being sufficiently small so that the vectorial sum for the faulted phase is in general the smallest of the plurality of vectorial sums.

SHIRLEY L. GOLDSBOROUGH.

No references cited.